United States Patent
Brickell et al.

(10) Patent No.: US 7,571,329 B2
(45) Date of Patent: Aug. 4, 2009

(54) METHOD OF STORING UNIQUE CONSTANT VALUES

(75) Inventors: Ernie F. Brickell, Portland, OR (US); Alberto J. Martinez, El Dorado Hills, CA (US); David W. Grawrock, Aloha, OR (US); James A. Sutton, II, Portland, OR (US); Clifford D. Hall, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 827 days.

(21) Appl. No.: 10/891,699

(22) Filed: Jul. 14, 2004

(65) Prior Publication Data

US 2006/0015751 A1    Jan. 19, 2006

(51) Int. Cl.
  G06F 12/14    (2006.01)
  G06F 11/30    (2006.01)
(52) U.S. Cl. .................. 713/193; 713/167
(58) Field of Classification Search ............ 713/193
  See application file for complete search history.

(56) References Cited

U.S. PATENT DOCUMENTS

| | | | |
|---|---|---|---|
| 5,745,044 A * | 4/1998 | Hyatt et al. ............ | 340/5.23 |
| 6,839,837 B1 * | 1/2005 | Morishita ............... | 713/164 |
| 2001/0025342 A1 * | 9/2001 | Uchida ................... | 713/186 |
| 2002/0026424 A1 * | 2/2002 | Akashi ................... | 705/57 |
| 2003/0181230 A1 * | 9/2003 | Shimoda ................. | 463/7 |
| 2003/0210787 A1 * | 11/2003 | Billhartz et al. ........ | 380/270 |
| 2003/0236983 A1 * | 12/2003 | Mihm, Jr. ............... | 713/172 |
| 2004/0010688 A1 * | 1/2004 | Matsuzaki et al. ...... | 713/169 |
| 2004/0039924 A1 * | 2/2004 | Baldwin et al. ........ | 713/189 |
| 2004/0172538 A1 * | 9/2004 | Satoh et al. ............ | 713/175 |
| 2006/0005237 A1 * | 1/2006 | Kobata et al. .......... | 726/12 |
| 2007/0250708 A2 * | 10/2007 | Holden et al. .......... | 713/166 |

* cited by examiner

*Primary Examiner*—Emmanuel L Moise
*Assistant Examiner*—Luu Pham (57) ABSTRACT

Secure storage and retrieval of a unique value associated with a device to/from a memory of a processing system. In at least one embodiment, the device needs to be able to access the unique value across processing system resets, and the device does not have sufficient non-volatile storage to store the unique value itself. Instead, the unique value is stored in the processing system memory in such a way that the stored unique value does not create a unique identifier for the processing system or the device. A pseudo-randomly or randomly generated initialization vector may be used to vary an encrypted data structure used to store the unique value in the memory.

21 Claims, 7 Drawing Sheets

METHOD OF STORING UNIQUE CONSTANT VALUES

BACKGROUND

1. Field

The present invention relates generally to computer security and, more specifically, to securely storing unique values for use by devices in processing systems.

2. Description

Some processing system architectures supporting content protection and/or computer security features require that specially-protected or "trusted" software modules be able to create an authenticated encrypted communications session with specific protected or "trusted" hardware devices in the processing system (such as graphics controller cards, for example). One commonly used method for both identifying the device and simultaneously establishing the encrypted communications session is to use a one-side authenticated Diffie-Helman (DH) key exchange process. In this process, the device is assigned a unique public/private Rivest, Shamir and Adelman (RSA) algorithm key pair or a unique Elliptic Curve Cryptography (ECC) key pair. However, because this authentication process uses RSA or ECC keys, the device then has a unique and provable identity, which can raise privacy concerns. In the worst case, these concerns may result in a lack of support from original equipment manufacturers (OEMs) for building trustable devices providing this kind of security.

BRIEF DESCRIPTION OF THE DRAWINGS

The features and advantages of the present invention will become apparent from the following detailed description of the present invention in which.

DETAILED DESCRIPTION

Embodiments of the present invention comprise methods for securely storing and retrieving a unique value associated with a device to/from a memory of a processing system. In at least one embodiment, the device needs to be able to access the unique value across processing system resets, and the device does not have sufficient non-volatile storage to store the unique value itself. Instead, the unique value is stored in the processing system memory in such a way that the stored unique value does not create a unique identifier for the processing system or the device. In at least one embodiment, the unique value associated with the device is a constant value for the life of the device. In other embodiments, the unique value associated with the device may be changed over time. A randomly or pseudo-randomly generated initialization vector may be used to vary the encrypted data structure used to store the unique value in the memory. In various embodiments, the unique value may be one or more of a Direct Proof private key unique for the device, a RSA private key, a digital certificate issued to the device that certifies a corresponding RSA public key for the device, a device identifier, or other values.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
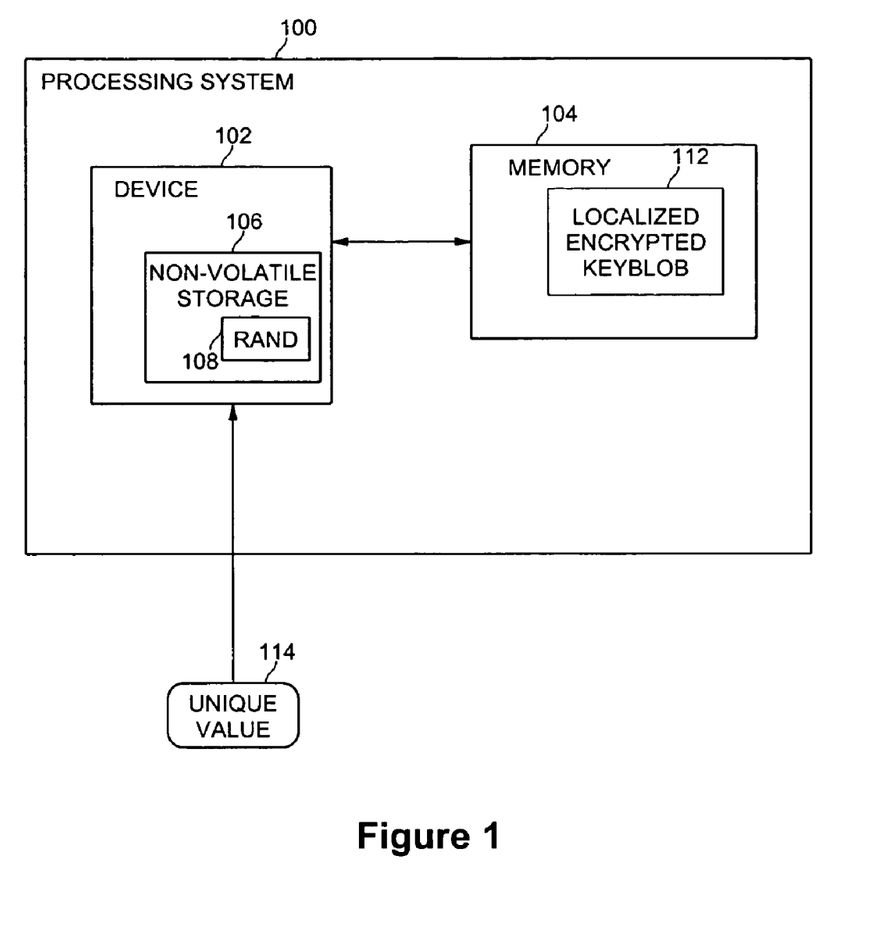
FIG. 1 is a diagram of a system architecture according to an embodiment of the invention.

Referring now to FIG. 1, a processing system 100 comprises any type of communications or computing device that is adapted to transmit, receive, and process information. Examples of processing systems include, but are not limited to, computer systems, personal digital assistants (PDAs), cellular telephones, set-top boxes, facsimile machines, printers, modems, routers, or other electronic equipment. Processing system 100 may include many well-known components such as one or more processors, communications buses, peripherals, etc., that are omitted from FIG. 1 for the purpose of clarity in describing the present invention. The processing system includes at least one device 102 and at least one memory 104. The device may be a peripheral controller device such as a graphics controller device, an input/output (I/O) device, or other type of controller, having circuitry for controlling processing of a system component. In one embodiment, the device may have limited non-volatile storage 106, and the non-volatile storage may be used to store a unique secret pseudo-random number RAND 108. The RAND value may be stored in the non-volatile storage as part of the manufacturing process for the device. The memory may be a non-volatile semiconductor memory for storing information and instructions executed by a processor (not shown). In one embodiment, memory 104 stores a data structure called a localized encrypted keyblob 112, to be described in further detail below. At an appropriate time, the processing system acquires a unique value 114 for the device using a secure unique value acquisition method. The unique value may be associated with the device and may need to be stored in and used by the processing system in such as way as to not uniquely identify the processing system.

It is appreciated that a lesser or more equipped processing system than described above may be desirable for certain implementations and that details have been omitted in FIG. 1 for clarity. Therefore, the configuration of processing system 100 will vary from implementation to implementation depending on numerous factors, such as price constraints, performance requirements, technological improvements, and/or other circumstances.

In one embodiment of the present invention, there may be four stages of processing for interacting with the unique value: an initialization stage, a storage stage, a retrieval stage, and a localized encrypted keyblob update stage.

Figure 2:
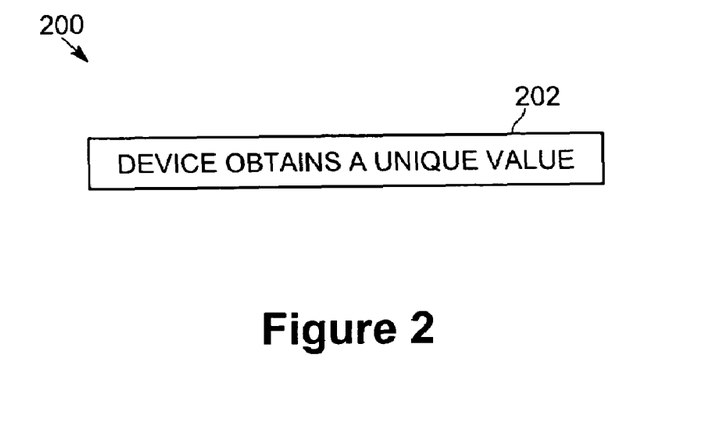
FIG. 2 is a flow diagram of initialization processing according to an embodiment of the present invention.

FIG. 2 is a flow diagram 200 illustrating initialization stage processing according to an embodiment of the present invention. At block 202, the device 102 obtains a unique value 114 in a secure manner from another processing entity using a known unique value acquisition method. In one embodiment, implementation of a cryptographic protocol is used between the device and the entity to ensure that acquisition of the unique value by the device from the other processing entity is secure. The unique value may be uniquely associated with the device.

Figure 3:
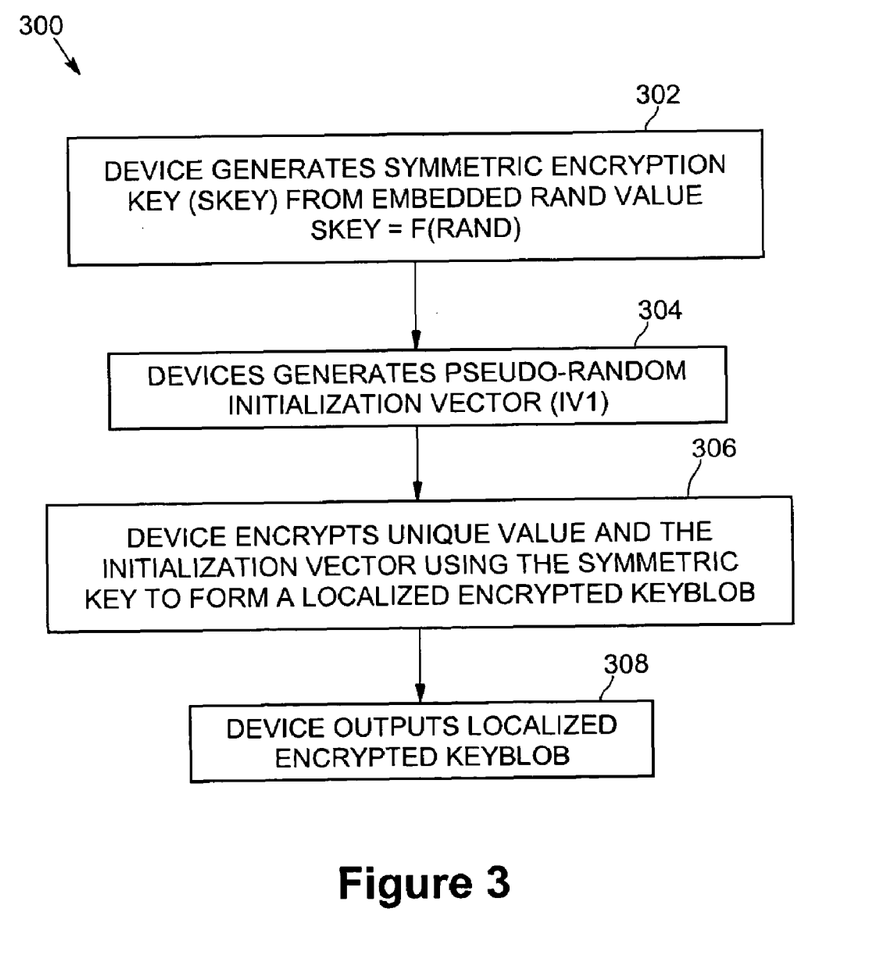
FIG. 3 is a flow diagram of unique value storage processing according to an embodiment of the present invention.

FIG. 3 is a flow diagram 300 illustrating unique value storage stage processing according to an embodiment of the present invention. At block 302, the device uses a one-way function F to generate a symmetric encryption key SKEY from its embedded secret unique RAND value (SKEY=F (RAND)). The one-way function may be an implementation of any known algorithm appropriate for this purpose (e.g., SHA-1, MGF1, Data Encryption Standard (DES), Triple DES, etc.). At block 304, the device generates a first pseudo-random or random initialization vector (IV1) having a plurality of pseudo-randomly or randomly generated bits. At block 306, the device encrypts the unique value 114 received from the other processing entity and the initialization vector using the generated symmetric key SKEY to form a data structure called a localized encrypted keyblob 112 (LocKeyBlob1=Encrypt (IV1, Unique Value) using SKEY). If a stream cipher is used for the encryption, then the IV is used in the common method for using an IV in a stream cipher. If a block cipher is used for the encryption, then the IV will be used as part of the message to be encrypted, thus making an instance of the encryption to be different if the IV is different, even if the keys are the same. At block 308, the device outputs the localized encrypted keyblob for storage in the memory 104. In one embodiment, if a stream cipher is used for the encryption, the IV may be output for storage along with the encrypted keyblob. As a result of this processing, the unique value is securely stored within the localized encrypted keyblob in the memory on the processing system. Since the keyblob is encrypted using a key generated by the device based on the secret unique pseudo-random value stored in a protected manner within the device, the unique value may be very difficult to access by an attacker on the processing system. In one embodiment, the pseudo-random value (RAND) may be stored within a trusted platform module (TPM) included in the device. The inclusion of the pseudo-randomly or randomly generated initialization vector in the localized keyblob helps to ensure that the keyblob does not uniquely identify the device or the processing system.

Figure 4:
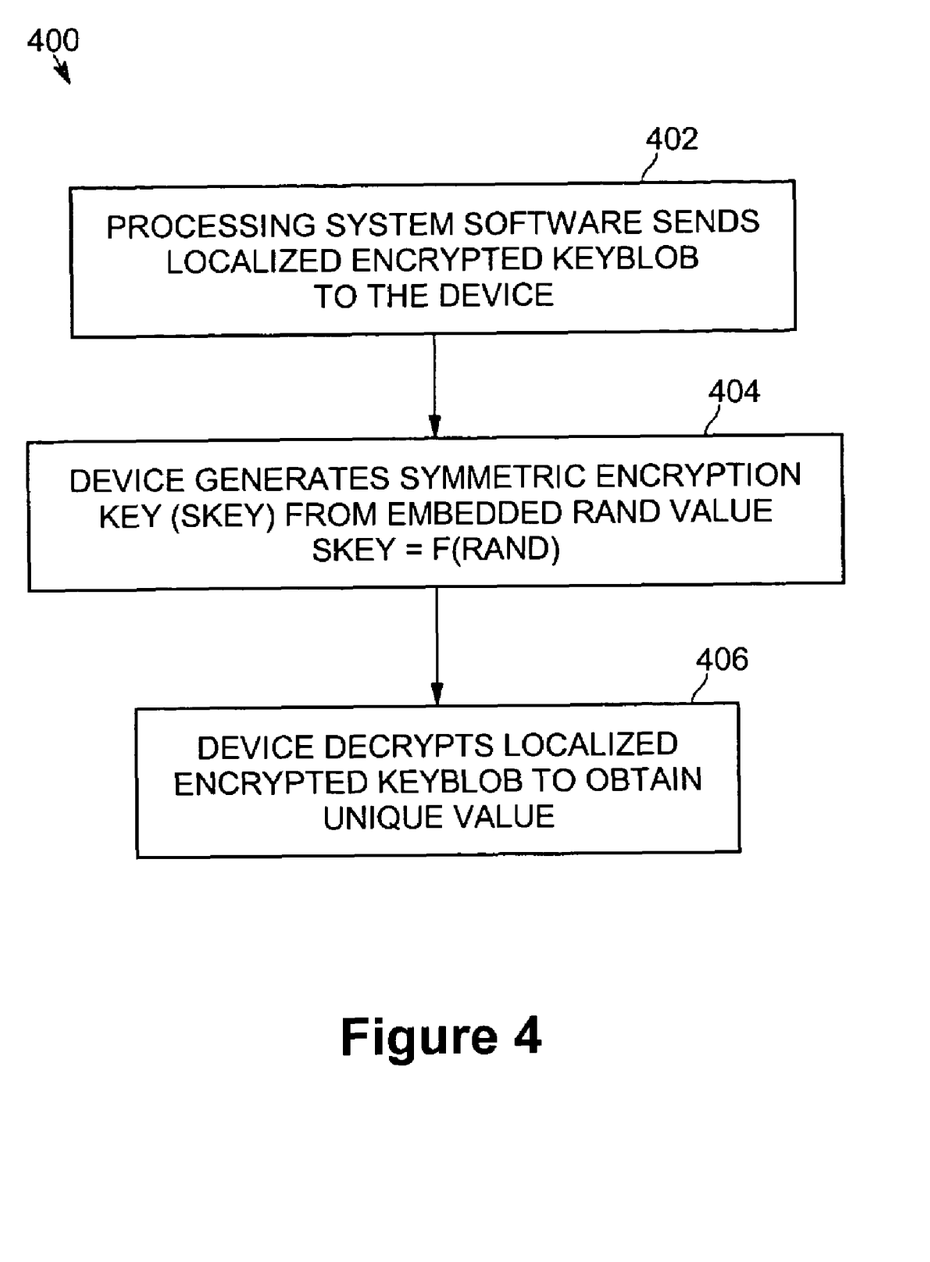
FIG. 4 is a flow diagram of unique value retrieval processing according to an embodiment of the present invention.

When the device needs to access the unique value again (as part of a cryptographic process, for example), the device accesses the memory to obtain the localized encrypted keyblob and extract the unique value. In one embodiment, the IV is obtained in addition to the keyblob. FIG. 4 is a flow diagram 400 illustrating unique value retrieval stage processing according to an embodiment of the present invention. At block 402, software being executed by the processing system causes the sending of the localized encrypted keyblob from the memory to the device. In one embodiment, the IV is sent in addition to the keyblob. In one embodiment, this software comprises a device driver software module associated with the device. At block 404, the device uses its one-way function F to generate the symmetric encryption key SKEY based on the embedded pseudo-random value (SKEY=F(RAND)). At block 406, the device decrypts the localized encrypted keyblob using the symmetric key SKEY to obtain the unique value. In one embodiment, the unique value may be temporarily stored in a volatile storage within the device. The unique value is then available for use by the device.

In some circumstances, the device may desire to change the contents of the localized encrypted keyblob. For example, in one embodiment, every time the device accesses the unique value by retrieving it from the memory, the device may change the keyblob prior to storage of the unique value again in the memory so that an attacker cannot deduce a unique identifier for the device or the processing system based on observing retrieval and/or storage operations of the keyblob. In other embodiments, the frequency of updating the keyblob may be once every N access times, where N is a positive integer, or the frequency of update may be variable.

Figure 5:
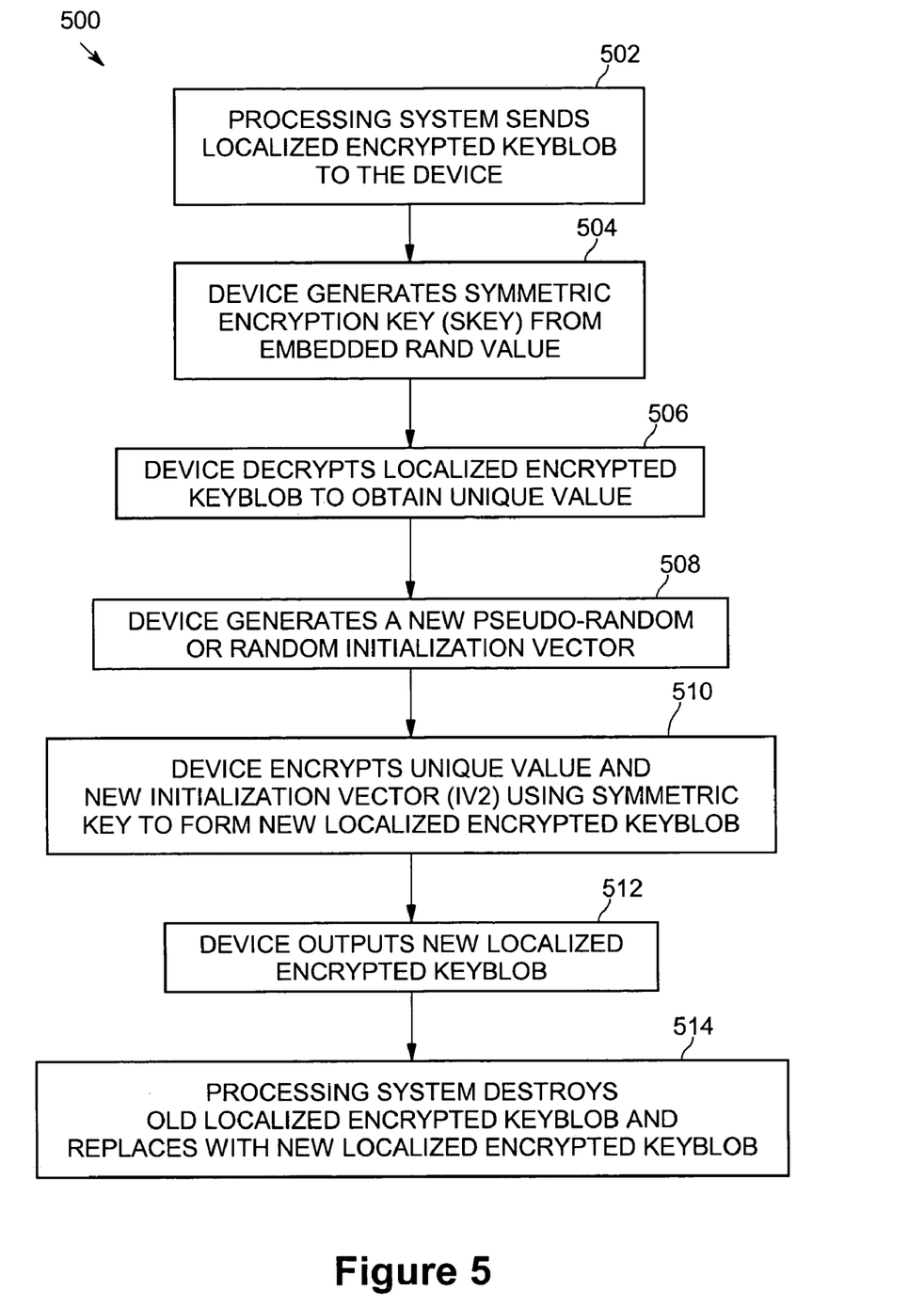
FIG. 5 is a flow diagram of localized encrypted keyblob update processing according to a first embodiment of the present invention.

FIG. 5 is a flow diagram 500 illustrating localized encrypted keyblob update stage processing according to an embodiment of the present invention. At block 502, software executing on the processing system (such as device driver software, for example) sends the localized encrypted keyblob from the memory to the device. In one embodiment, the IV is sent in addition to the keyblob. At block 504, the device uses its one-way function F to generate the symmetric encryption key SKEY based on the device's embedded secret pseudo-random value (SKEY=F(RAND)). At block 506, the device decrypts the localized encrypted keyblob using the symmetric key SKEY to obtain the unique value. At block 508, the device generates a new pseudo-random or random initialization vector (IV2) that is different than the old initialization vector. At block 510, the device encrypts the unique value and the newly generated initialization vector IV2 using the symmetric key SKEY to form a new localized encrypted keyblob (LocKeyBlob2=Encrypt (IV2, Unique Value) using SKEY). At block 512, the device outputs the new localized encrypted keyblob and causes it to be stored in the memory. In one embodiment, the IV is output in addition to the keyblob. At block 514, software being executed by the processing system deletes or otherwise destroys the old localized encrypted keyblob and replaces it with the new localized encrypted keyblob. In one embodiment, the new keyblob overwrites the old keyblob. By changing the pseudo-randomly or randomly generated initialization vector in the keyblob, embodiments of the present invention may deter attacks on determining a unique identifier for the device or the processing system. In one embodiment, if the initialization vector was output, then the old initialization vector is deleted or destroyed and replaced with the new initialization vector.

In this embodiment, whenever the processing system directs the device to perform an update of the localized encrypted keyblob, the device will output a new localized encrypted keyblob that is different than the previous keyblob. The new keyblob is different than the old keyblob because the initialization vector has been changed. If the secret pseudo random value is chosen to be long enough (for example, 128 bits), if initialization vectors are different, and if good encryption techniques are used, then it may be computationally infeasible for an attacker to tell whether two localized encrypted keyblobs were produced by the same device or not.

In another embodiment of the present invention, instead of, or in addition to using an initialization vector, a monotonic counter stored in the non-volatile storage of the device may also be used.

Figure 6:
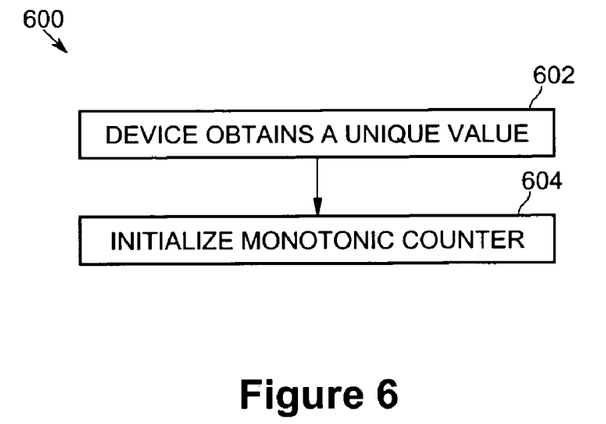
FIG. 6 is a flow diagram of initialization processing according to another embodiment of the present invention.

FIG. 6 is a flow diagram 600 illustrating initialization stage processing according to another embodiment of the present invention. At block 602, the device 102 obtains a unique value 114 in a secure manner from another processing entity using a known unique value acquisition method. In one embodiment, implementation of a cryptographic protocol is used between the device and the entity to ensure that acquisition of the unique value by the device from the other processing entity is secure. The unique value may be uniquely associated with the device. At block 604, a monotonic counter stored in the non-volatile storage of the device may be initialized to a pre-determined value (e.g., zero or some other value).

Figure 7:
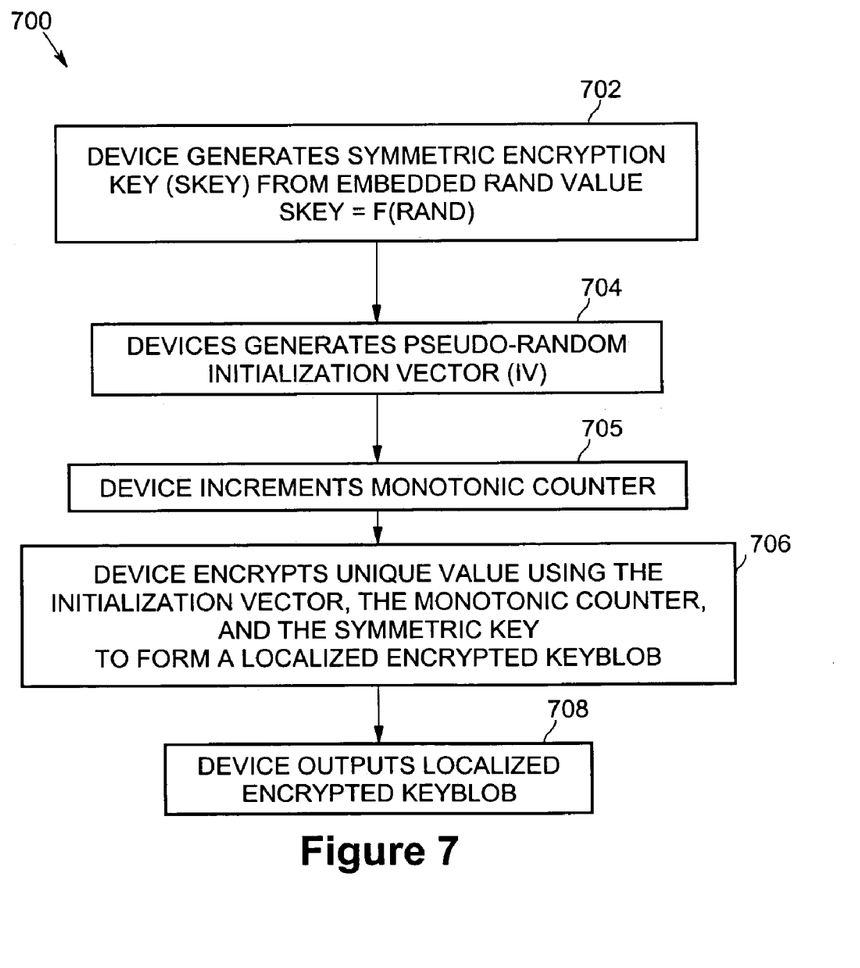
FIG. 7 is a flow diagram of unique value storage processing according to another embodiment of the present invention.

FIG. 7 is a flow diagram 700 illustrating unique value storage stage processing according to another embodiment of the present invention. At block 702, the device uses a one-way function F to generate a symmetric encryption key SKEY from its embedded unique RAND value (SKEY=F(RAND)). The one-way function may be an implementation of any known algorithm appropriate for this purpose (e.g., SHA-1, MGF1, Data Encryption Standard (DES), Triple DES, etc.). At block 704, the device generates a first pseudo-random or random initialization vector (IV1) having a plurality of pseudo-randomly or randomly generated bits. At block 705, the device updates the monotonic counter by incrementing the counter. In other embodiments, the monotonic counter may be updated by decrementing. At block 706, the device encrypts the unique value 114 received from another entity, the initialization vector, and the monotonic counter using the generated symmetric key SKEY to form a data structure called a localized encrypted keyblob 112 (LocKeyBlob1=Encrypt (IV1, Monotonic Counter, Unique Value) using SKEY). At block 708, the device outputs the localized encrypted keyblob for storage in the memory 104. In one embodiment, the IV1 is output in addition to the keyblob. As a result of this processing, the unique value is securely stored within the localized encrypted keyblob in the memory on the processing system. Since the keyblob is encrypted using a key generated by the device based on the unique pseudo-random value stored in a protected manner within the device, the unique value may be very difficult to access by an attacker on the processing system. In one embodiment, the pseudo-random value (RAND) may be stored within a trusted platform module (TPM) included in the device. The inclusion of the pseudo-randomly or randomly generated initialization vector, as well as the monotonic counter in the localized keyblob helps to ensure that the keyblob does not uniquely identify the device or the processing system.

Figure 8:
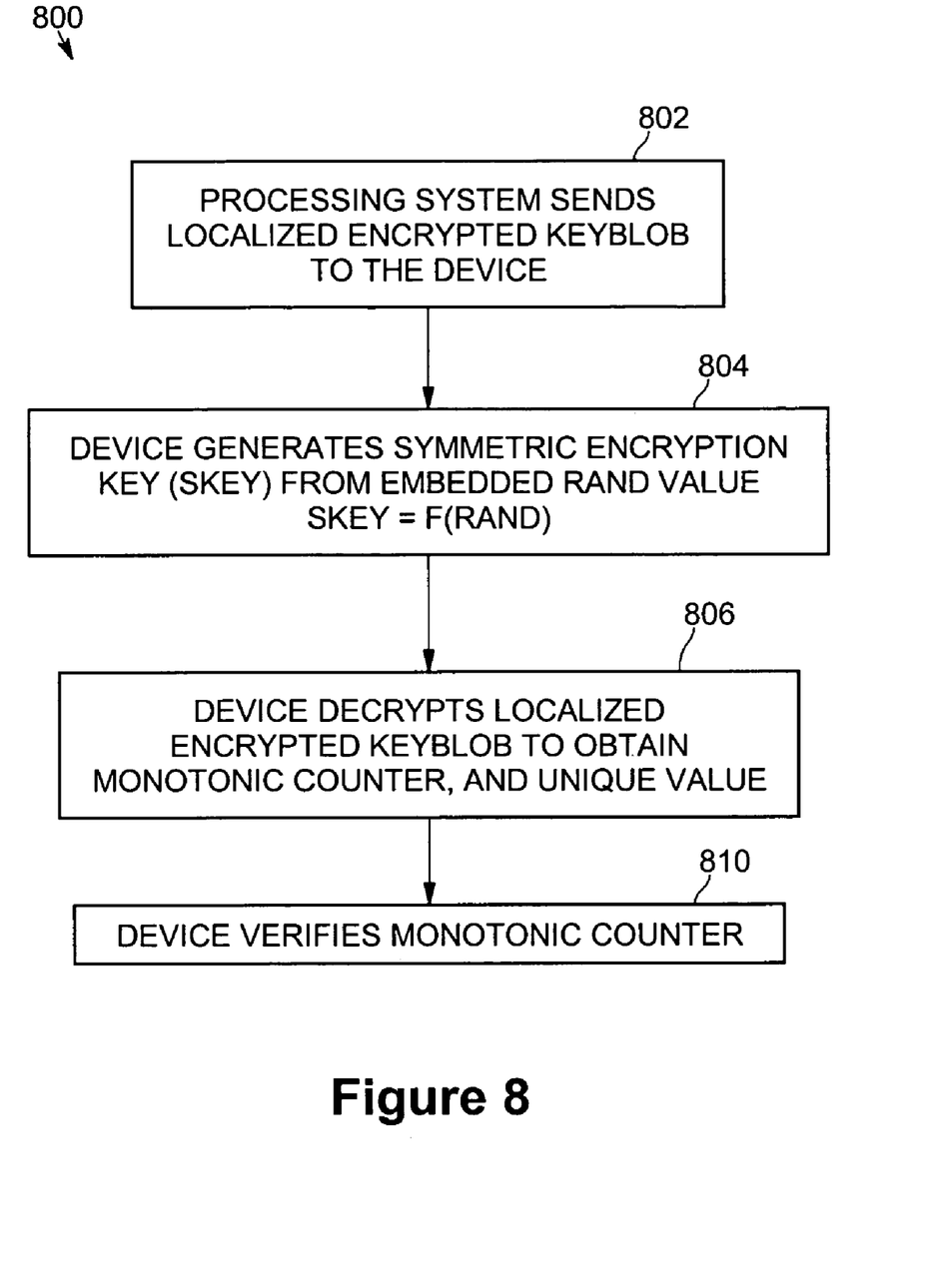
FIG. 8 is a flow diagram of unique value retrieval processing according to another embodiment of the present invention.

When the device needs to access the unique value again (as part of a cryptographic process, for example), the device accesses the memory to obtain the localized encrypted keyblob. FIG. 8 is a flow diagram 800 illustrating unique value retrieval stage processing according to an embodiment of the present invention. At block 802, software being executed by the processing system causes the sending of the localized encrypted keyblob from the memory to the device. In one embodiment, the initialization vector is sent to the device in addition to the keyblob. In one embodiment, this software comprises a device driver software module associated with the device. At block 804, the device uses its one-way function F to generate the symmetric encryption key SKEY based on the embedded pseudo-random value (SKEY=F(RAND)). At block 806, the device decrypts the localized encrypted keyblob using the symmetric key SKEY to obtain the monotonic counter, and the unique value. At block 808, the device verifies the monotonic counter to determine if it is correct (that is, if the monotonic counter obtained from the keyblob matches the monotonic counter in the non-volatile storage of the device).

Figure 9:
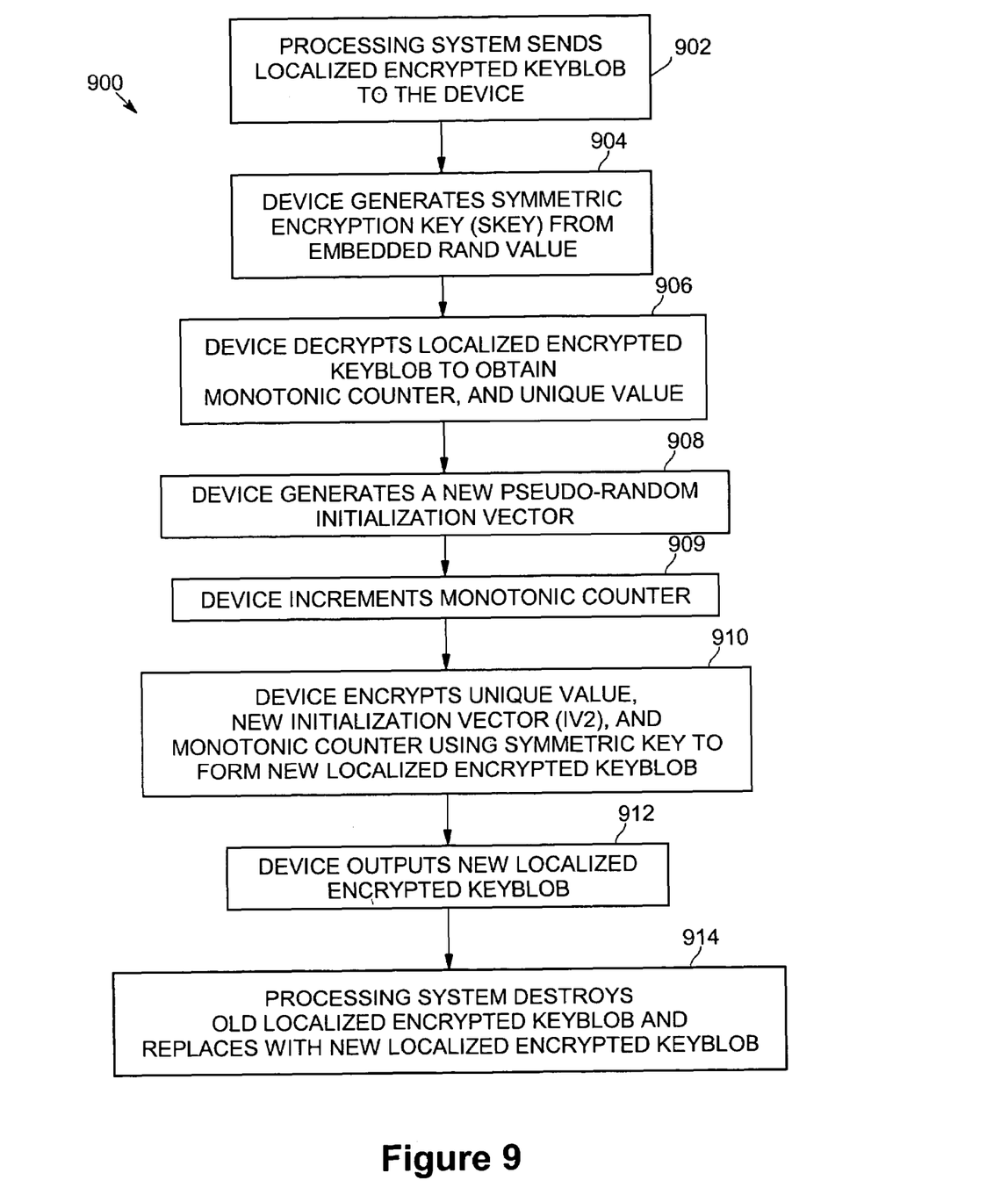
FIG. 9 is a flow diagram of localized encrypted keyblob update processing according to another embodiment of the present invention.

In some circumstances, the device may desire to change the contents of the localized encrypted keyblob. For example, in one embodiment, every time the device accesses the unique value by retrieving it from the memory, the device may change the keyblob prior to storage so that an attacker cannot deduce a unique identifier for the device or the processing system based on observing retrieval and/or storage operations of the keyblob. In other embodiments, the frequency of updating the keyblob may be once every N access times, where N is a positive integer, or the frequency of update may be variable. FIG. 9 is a flow diagram 900 illustrating localized encrypted keyblob update stage processing according to another embodiment of the present invention. At block 902, software executing on the processing system (such as device driver software, for example) sends the localized encrypted keyblob from the memory to the device. In one embodiment, the initialization vector is sent in addition to the keyblob. At block 904, the device uses its one-way function F to generate the symmetric encryption key SKEY based on the device's embedded pseudo-random value (SKEY=F(RAND)). At block 906, the device decrypts the localized encrypted keyblob using the symmetric key SKEY to obtain the monotonic counter, and the unique value. At block 908, the device generates a new pseudo-random or random initialization vector (IV2) that is different than the old initialization vector. At block 909, the device updates the monotonic counter by incrementing the counter. In other embodiments, the counter may be updated by decrementing. At block 910, the device encrypts the unique value, the monotonic counter, and the newly generated initialization vector IV2 using the symmetric key SKEY to form a new localized encrypted keyblob (LocKeyBlob2=Encrypt (IV2, Monotonic Counter, Unique Value) using SKEY). At block 912, the device outputs the new localized encrypted keyblob and causes it to be stored in the memory. In one embodiment, the initialization vector is output in addition to the keyblob. At block 914, software being executed by the processing system destroys the old localized encrypted keyblob and replaces it with the new localized encrypted keyblob. In one embodiment, the new keyblob overwrites the old keyblob. By changing the pseudo-randomly or randomly generated initialization vector and the monotonic counter in the keyblob, embodiments of the present invention may further deter attacks on determining a unique identifier for the device or the processing system. In one embodiment, if the initialization vector was output, then the old initialization vector is deleted or destroyed and replaced with the new initialization vector.

There may be some instances in which the non-volatile storage in the device may be relatively permanent, but could be destroyed or made inaccessible at times. If this happens, then the device would no longer accept the localized encrypted keyblob because the monotonic counter verification would fail. To protect against this possibility, in another embodiment the retrieval of the unique value may be repeatable. Instead of starting the monotonic counter from the same state every time (e.g., always starting at zero for example), the device may generate a pseudo-random starting point for the monotonic counter, whenever it has been destroyed. By starting from a pseudo-random starting point, this embodiment avoids the problem of starting again from a fixed value such as zero, wherein the localized encrypted keyblobs that were produced earlier would again be valid.

In another embodiment, the monotonic counter may be replaced by a pseudo-random value. In this embodiment, instead of incrementing the monotonic counter, a new pseudo-random value may be chosen. If the pseudo-random value is kept secret on the device, then this embodiment may use a relatively small pseudo-random value (such as 20 bits, for example) to provide improved security. In this case, an attacker who had obtained a previously encrypted blob would have only a chance of 1 in $2^{20}$ of having the device accept the keyblob in an attack.

For robustness, in another embodiment it may be desirable to allow a few different encrypted keyblobs to be accepted by the device. In the embodiment of the monotonic counter, this case may be implemented by allowing an encrypted keyblob to be accepted if it was within a predetermined window (e.g., 5 ticks) of the current monotonic counter value.

Although the operations discussed herein may be described as a sequential process, some of the operations may in fact be performed in parallel or concurrently. In addition, in some embodiments the order of the operations may be rearranged without departing from the spirit of the invention.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   obtaining a unique value associated with a device of a processing system, via the unique value the device is identifiable; and
   securely storing the unique value in the processing system without exposing outside the device a unique identifier of the device, wherein securely storing the unique value comprises
   generating an encryption key based at least in part on a secret value securely stored in the device;
   generating an initialization vector having a plurality of pseudo-randomly or randomly generated bits;
   encrypting the unique value associated with the device using both the encryption key and the initialization vector as inputs to form an encrypted data structure;
   storing the encrypted data structure in a memory of the processing system that is external to the device; and
   periodically replacing the encrypted data structure with a modified encrypted data structure formed from encrypting the unique value using both the encryption key and a new initialization vector having a plurality of pseudo-randomly or randomly generated bits, wherein
   periodically replacing the encrypted data structure occurs every N accesses of the unique value by the device, where N is a positive integer.

2. The method of claim 1, wherein obtaining the unique value comprises using a cryptographic protocol for communications between the device and a processing entity external to the processing system to securely obtain the unique value.

3. The method of claim 1, wherein generating the encryption key comprises generating the encryption key using a one-way function.

4. The method of claim 1, wherein the secret value is stored in non-volatile memory in the device.

5. The method of claim 1, further comprising:
   obtaining the encrypted data structure from the memory;
   generating the encryption key based at least in part on the secret value securely stored in the device; and
   decrypting the encrypted data structure using the encryption key to obtain the unique value associated with the device.

6. The method of claim 5, further comprising using the unique value in processing of a cryptographic protocol.

7. The method of claim 1, wherein replacing the encrypted data structure with a modified encrypted data structure comprises
   obtaining the encrypted data structure from the memory;
   generating the encryption key based at least in part on the secret value securely stored in the device;
   decrypting the encrypted data structure using the encryption key to obtain the unique value associated with the device;
   generating the new initialization vector having a plurality of pseudo-randomly or randomly generated bits;
   encrypting the unique value associated with the device using both the encryption key and the new initialization vector as inputs to form the modified encrypted data structure;
   storing the updated encrypted data structure in a memory of the processing system; and
   deleting the encrypted data structure from the memory.

8. An article comprising: a storage medium having a plurality of machine readable instructions, wherein when the instructions are executed by a processor, the instructions provide for securely storing a unique value associated with a device in a processing system without exposing outside the device a unique identifier of the device by
  obtaining the unique value associated with the device, the unique value uniquely identifying the device;
  generating an encryption key based at least in part on a secret value securely stored in the device;
  generating an initialization vector having a plurality of pseudo-randomly or randomly generated bits;
  encrypting the unique value associated with the device using both the encryption key and the initialization vector as inputs to form a first encrypted data structure;
  storing the first encrypted data structure in a memory of the processing system that is external to the device; and
  replacing the first encrypted data structure in the memory with a second encrypted data structure formed from encrypting the unique value, the second encrypted data structure being different than the first encrypted data structure, wherein
  generating the second initialization vector, encrypting the second encrypted data structure, storing the second encrypted data structure, and deleting the encrypted data structure are performed every N accesses of the unique value by the device, where N is a positive integer.

9. The article of claim 8, wherein instructions for obtaining the unique value comprise instructions for using a cryptographic protocol for communications between the device and a processing entity external to the processing system to securely obtain the unique value.

10. The article of claim 8, wherein instructions for generating the encryption key comprise instructions for generating the encryption key using a one-way function.

11. The article of claim 8, further comprising instructions for
  obtaining the first encrypted data structure from the memory;
  generating the encryption key based at least in part on the secret value securely stored in the device; and
  decrypting the first encrypted data structure using the encryption key to obtain the unique value associated with the device.

12. The article of claim 11, further comprising using the unique value in processing of a cryptographic protocol.

13. The article of claim 8, further comprising instructions for
  obtaining the first encrypted data structure from the memory;
  generating the encryption key based at least in part on the secret value securely stored in the device;
  decrypting the first encrypted data structure using the encryption key to obtain the unique value associated with the device;
  generating a second initialization vector having a plurality of pseudo-randomly or randomly generated bits;
  encrypting the unique value associated with the device using both the encryption key and the second initialization vector as inputs to form the second encrypted data structure;
  storing the second encrypted data structure in a memory of the processing system; and
  deleting the first encrypted data structure from the memory.

14. A method comprising:
  obtaining a unique value associated with and identifying a device of a processing system; and
  securely storing the unique value associated with the device in the processing system without exposing outside the device a unique identifier of the device, wherein securely storing the unique value comprises
  initializing a monotonic counter stored in the device;
  generating a encryption key based at least in part on a secret value securely stored in the device;
  generating an initialization vector having a plurality of pseudo-randomly or randomly generated bits;
  updating the monotonic counter;
  encrypting the unique value associated with the device and the monotonic counter using both the encryption key and the initialization vector as inputs to form a first encrypted data structure;
  storing the first encrypted data structure in a memory of the processing system that is separate from the device; and
  in response to accessing the first encrypted data structure, generating a second initialization vector having a plurality of pseudo-randomly or randomly generated bits, encrypting the unique value associated with the device and the monotonic counter using both the encryption key and the second initialization vector as inputs to form a second encrypted data structure that is different than the first encrypted data structure, and storing the second encrypted data structure in a memory of the processing system, wherein
  generating the second initialization vector, encrypting the second encrypted data structure, storing the second encrypted data structure, and deleting the encrypted data structure are performed every N accesses of the unique value by the device, where N is a positive integer.

15. The method of claim 14, wherein obtaining the unique value comprises using a cryptographic protocol for communications between the device and a processing entity external to the processing system to securely obtain the unique value.

16. The method of claim 14, further comprising:
  obtaining the first encrypted data structure from the memory;
  generating the encryption key based at least in part on the secret value securely stored in the device;
  decrypting the first encrypted data structure using the encryption key to obtain the unique value associated with the device and the monotonic counter; and
  verifying the monotonic counter.

17. The method of claim 14, further comprising:
  obtaining the first encrypted data structure from the memory;
  generating the encryption key based at least in part on the secret value securely stored in the device;
  decrypting the first encrypted data structure using the encryption key to obtain the unique value associated with the device and the monotonic counter;
  updating the monotonic counter prior to encrypting the unique value and the monotonic counter to form the second encrypted data structure;
  deleting the first encrypted data structure from the memory.

18. An article comprising: a storage medium having a plurality of machine readable instructions, wherein when the instructions are executed by a processor, the instructions provide for securely storing a unique value associated with a device in a processing system without exposing outside the device a unique identifier for the device by
  obtaining the unique value associated with and uniquely identifying the device;
  initializing a monotonic counter stored in the device;
  generating a encryption key based at least in part on a secret value securely stored in the device;
  generating an initialization vector having a plurality of pseudo-randomly or randomly generated bits;
  updating the monotonic counter;

encrypting the unique value associated with the device and the monotonic counter using both the encryption key and the initialization vector as inputs to form a first encrypted data structure;

storing the first encrypted data structure in a memory of the processing system that is external to the device; and updating the first encrypted data structure in the memory of the processing system to a second encrypted data structure that is different than the first encrypted data structure, the second encrypted data structure formed from encrypting the unique value and the monotonic counter using both the encryption key and a randomly or pseudo-randomly generated second initialization vector, wherein instructions for updating the first encrypted data structure with the second encrypted data structure are performed every N accesses of the unique value by the device, where N is a positive integer.

19. The article of claim 18, further comprising instructions for obtaining the first encrypted data structure from the memory;

generating the encryption key based at least in part on the secret value securely stored in the device;

decrypting the first encrypted data structure using the encryption key to obtain the unique value associated with the device and the monotonic counter; and verifying the monotonic counter.

20. The article of claim 18, further comprising instructions for obtaining the first encrypted data structure from the memory;

generating the encryption key based at least in part on the secret value securely stored in the device;

decrypting the first encrypted data structure using the encryption key to obtain the unique value associated with the device and the monotonic counter;

updating the monotonic counter; and encrypting the unique value associated with the device and the monotonic counter using both the encryption key and the second initialization vector as inputs to form the second encrypted data structure;

wherein updating the first encrypted data structure with the second encrypted data structure comprises storing the second encrypted data structure in a memory of the processing system, and deleting the first encrypted data structure from the memory.

21. The article of claim 18, wherein instructions for initializing the monotonic counter comprise instructions for setting the monotonic counter to a pseudo-randomly generated starting value.

* * * * *